(12) United States Patent
Gao et al.

(10) Patent No.: US 8,121,039 B2
(45) Date of Patent: Feb. 21, 2012

(54) UNITED ROUTE QUERY METHOD IN THE AUTOMATIC SWITCHED OPTICAL NETWORK

(75) Inventors: Peng Gao, Shenzhen (CN); Desheng Sun, Shenzhen (CN)

(73) Assignee: ZTE Corporation (CN)

( * ) Notice: Subject to any disclaimer, the term of this patent is extended or adjusted under 35 U.S.C. 154(b) by 321 days.

(21) Appl. No.: 12/514,508

(22) PCT Filed: Nov. 28, 2006

(86) PCT No.: PCT/CN2006/003194
§ 371 (c)(1),
(2), (4) Date: May 12, 2009

(87) PCT Pub. No.: WO2008/064518
PCT Pub. Date: Jun. 5, 2008

(65) Prior Publication Data
US 2010/0054736 A1    Mar. 4, 2010

(51) Int. Cl.
*H04L 12/26* (2006.01)
(52) U.S. Cl. ............. 370/238; 370/252; 398/45; 398/57
(58) Field of Classification Search .................. None
See application file for complete search history.

(56) References Cited

U.S. PATENT DOCUMENTS

| | | | |
|---|---|---|---|
| 7,339,889 B2 * | 3/2008 | Lee et al. | 370/230 |
| 7,689,120 B2 * | 3/2010 | Hoang et al. | 398/57 |
| 7,782,798 B2 * | 8/2010 | Xu | 370/255 |
| 7,849,225 B2 * | 12/2010 | Schofield et al. | 709/250 |
| 8,050,277 B2 * | 11/2011 | Sun | 370/395.21 |
| 2003/0235153 A1 * | 12/2003 | Lee et al. | 370/229 |
| 2004/0184441 A1 | 9/2004 | Wu et al. | |
| 2006/0039391 A1 | 2/2006 | Vasseur et al. | |
| 2006/0171320 A1 | 8/2006 | Vasseur et al. | |
| 2006/0200579 A1 | 9/2006 | Vasseur et al. | |

(Continued)

FOREIGN PATENT DOCUMENTS

CN        1585338 A       2/2005

(Continued)

OTHER PUBLICATIONS

Extended European Search Report Dated Feb. 8, 2011, Applicant ZTE Corporation, Application No. 06817913.4-2416 / 2096801 PCT/CN2006003194, 2 Pages.
Draft ITU-T Recommentation G.7715/Y.1706—"Architecture and Requirements for Routing in the Atuomatically Switched Optical Network", XP-002461480, May 21, 2005—32 Pages.

(Continued)

*Primary Examiner* — Michael J Moore, Jr.
(74) *Attorney, Agent, or Firm* — Brooks Kushman P.C.

(57) ABSTRACT

A joint route query method in ASON. After the route controller in each route domain has received a route query request, it calls a routing algorithm based on the request and the route calculation is performed based on the route database of the current node; if the route calculation succeeds, a route query result is returned to the requester, if no complete route can be obtained, said route query request will be forwarded to the RC in the parent domain. Based on the request, the RC in the parent domain interacts with RCs in other domain of the same layer, and the RCs in the sub-domains contained in the parent domain to complete the route query, and calculates to obtain a complete route, then a route query result will be returned to the RC that initiates the request and this RC will return the route query result to the requester.

8 Claims, 4 Drawing Sheets

U.S. PATENT DOCUMENTS

| | | | |
|---|---|---|---|
| 2007/0160039 A1* | 7/2007 | Xu | 370/389 |
| 2008/0170854 A1* | 7/2008 | Li | 398/45 |
| 2010/0061724 A1* | 3/2010 | Sun | 398/45 |
| 2010/0086299 A1* | 4/2010 | Sun | 398/45 |

FOREIGN PATENT DOCUMENTS

| | | |
|---|---|---|
| CN | 1585358 A | 2/2005 |
| CN | 1588920 A | 3/2005 |
| CN | 1816000 A | 8/2006 |

OTHER PUBLICATIONS

ITU-T Telecommunication Standarization Sector of ITU G.8080/Y. 1304 (Nov. 2001), Architecture for the Atuomatically Switched Optical Network (ASON), XP-002311603, International Telecommunication Union, 42 Pages.

Architecture requirements for routing in the automatically switched optical networks, International Telecommunications Union, ITU-T Recommendation G.7715/Y.1706, Jun. 2002, 35 pages.

* cited by examiner

UNITED ROUTE QUERY METHOD IN THE AUTOMATIC SWITCHED OPTICAL NETWORK

TECHNICAL FIELD

The present invention refers to the optical network field, specifically to a joint route query method in an automatic switched optical network (ASON).

BACKGROUND ART

Optical network, such as OTN (Optical Transmission Network), WDM (Wavelength-Division Multiplexing), SDH (Synchronous Digital Hierarchy) or SONET (Synchronous Optical Network) transmission network has already been widely used in the telecommunication field.

Automatic switched optical network (ASON) is the focus in optical network field these years. ITU-T G.8080 standard proposed the concept of ASON, wherein the function of an ASON is performed by setting special Control Plane (CP). ITU-T G.7713 standard provides the realization framework of distributed call and connection in an ASON network and provides the realization specification for the automatic establishment, modification and deletion of call and connection. Standard such as ITU-T G.7715 provides the realization model and method for the route query of the connection (the description about the route query in the rest part of the invention refers to the route query of the connection, unless declared particularly).

However, the published ITU-T G.7715 and ITU-T G.7715.1 both employ the model in FIG. 1. In this route model, when an ASON network element (NE) needs to query the connection route, the Connection Controller (CC) that is responsible for the connection control (including establishment, deletion, modification, etc.) initiates a route query request (shortly, Route Request) of the connection to the Route Controller (RC) that is responsible for route query and calculation. Based on the request, said RC calls a routing algorithm (one in common use is the Constrained Shortest Path First, CSPF) and calculates the route based on the routing database of the current node and returns the route calculation result (shortly, Route Response) to the CC.

However, the RDB of a node usually hardly owns complete routing information of the entire ASON network; especially when the ASON network includes multiple route domains, the RDB of a node usually only owns information of the local domain. As shown in FIG. 2, when it is needed to establish a connection (as a connection in dash line) between the A node in route domain 1 and the Q point in route domain 6, the model method in FIG. 1 can not satisfy the route query and calculation requirements of said connection, therefore, a new route query method in ASON is needed.

SUMMARY OF THE INVENTION

The technical problem that needs to be solved in present invention is to provide a joint route query method in an automatic switched optical network (ASON), solves the problem of route query in a cross-domain connection while being compatible with the route query within domains.

In order to solve the above technical problem, the current invention provides a joint route query method in an automatic switched optical network (ASON), which comprises the following steps:
(1). After the route controller (RC) in each route domain has received a route query request, it calls a routing algorithm based on the route request and calculates the route based on the routing database of the current node; if a complete route is obtained through calculation, a route query result is returned to the requester, if no complete route can be obtained through calculation, said route query request will be forwarded to the RC in the parent domain;
(2). After receiving the route query request, RC in the parent domain calculates the route in the local domain or further interacts with RCs in other domains of the same layer to complete the route query. If a complete route can be obtained through calculation or combination, a route query result will be returned to the requester through the RC that initiates the request, otherwise a failure message will be returned to the requester through the RC.

Furthermore, in step (1), said RC in each route domain can obtain the information of RCs, comprising address information, of the parent domain and other sub-domains of the same layer.

Furthermore, in step (1), the routing algorithm called by said RC in each route domain based on the route query request is the Constrained Shortest Path First (CSPF).

Furthermore, step (2) further comprises the following steps:
A1, after the RC in the parent domain has received the route query request, the hierarchy route query is completed in the local domain, if a complete route is obtained through calculation, then a route query result will be returned to the requester through the RC that initiates the request; otherwise, the route query request will be forwarded to RCs in other domains of the same layer as said RC in the parent domain;
A2, after the RCs in other domains have received the route query request, the route query is completed in the local domain, and a route query result will be returned to the RC in the parent domain that initiates the request;
A3, the RC in the parent domain that initiates the request decides whether a complete route has been obtained or can be obtained through combination, if yes, a route query result will be returned to the requester through the RC that initiates the request; otherwise, the next step is performed:
A4, the RC in the parent domain that initiates the request determines whether there exists RCs in the other domain of the same layer that are not queried yet in said parent domain, if yes, said route query request will be forwarded to one RC that is not queried yet in other domains of the same layer, returning to step A2; otherwise a route query failure message will be returned to the requester through said RC.

Furthermore, step (2) further comprises the following steps:
B1, after the RC in the parent domain has received the route query request, the route query is completed in the local domain, if a complete route is obtained through calculation, then a route query result will be returned to the requester through the RC that initiates the request; otherwise, the route query request will be broadcasted to the RCs in the rest domains of the same layer;
B2, the RCs of other domains of the same layer complete the route query in the local domain and return the route query result to the RC in the parent domain that initiates the request;
B3, the RC in the parent domain receives one or multiple route query results from the RCs in other domains of the same layer, if a complete route can be selected or one can be obtained through combination of the multiple results, then the route query result will be returned to the requester through the RC that initiates the request, otherwise a route calculation failure message will be returned to the requester through said RC.

Furthermore, step (2) further comprises the following steps:

C1, the RC in the parent domain determines whether said route query request is the cross-domain query request; if it is not a cross-domain query request, the RC in the parent domain completes the hierarchy route query in the local domain, and the route query result will be returned to the requester through the RC that initiates the request; if it is a cross-domain query request, then the next step is performed;

C2, the parent domain determines the exit border of the route in the local domain based on the route destination; after successfully calculating the route of the local domain, it sends out the route query request to a RC in another domain of the same layer that is connected with the exit border, the next step will be performed. If the route calculation of the local domain fails, the route query failure message will be returned to the requester through the RC that initiates the request;

C3, after the RC in another domain of the same layer receives the route query request, it determines whether the route destination node is in the local domain or not, if yes, after calculating the local domain route, it sends out the route calculation result to the RC in the parent domain that initiates the request, and step C4 is performed; otherwise, it determines the exit border of the route in the local domain based on the route destination and calculates the route in the local domain, after the successful calculation, it continues to send route query request to the RCs of the same layer that is connected with the exit border, and the next step is performed; if the calculation fails, a route query failure message will be returned to the RC of the domain that initiates the request;

Multiples of queries will be done until the RC in the domain where the destination node is located returns the calculation result to the upstream domain;

C4, when the RC in each domain on the routing path receives the successful route calculation result that is returned from the downstream domain, it sends it back to the RC that initiates the request together with the route query result calculated in the local domain; the action is repeated until the route query result is returned to the entry RC in the parent domain of the route query. Said RC in the parent domain returns the complete route query result to the requester through the RC that initiates the request.

Furthermore, in the step C4, if the RC in each domain on the route path receives a failure result of route calculation that is returned from the downstream domain, it passes the failure message upstream to reach said entry RC in the parent domain; then the route query failure message will be returned to the requester through the RC that initiates the request;

Furthermore, in the step (2), when each RC in the parent domain performs route query in the local domain by interacting with each sub-domain RC; namely, the RC in the parent domain sends the route query request to each sub-domain RC; each sub-domain RC returns the route query result of the local domain to the RC in the parent domain and after the combination, the parent domain obtains the complete route in the parent domain.

Furthermore, when the RC in the parent domain is interacting with the sub-domain RC, it forwards the route query request to one of the sub-domains; said sub-domain firstly calculates the route within the domain; if it succeeds, it returns the result to the RC in the parent domain; otherwise, said route query result will be forwarded to the sub-domain of the same layer that is connected with the exit node of the local domain until the route query succeeds; finally the query result will be returned to the RC in the parent domain in the original path level by level.

The joint route query method in the present invention completes the route query, which can not be done by the ASON network element of the local domain, through the interaction between RCs of route domains of the same layer and different layers; based on the route query conditions, the route query will be done by the RC in its parent domain, and finally the query result will be returned to the RC of the network element that initiates the request. The method has advantages of succinctness and trustiness.

DESCRIPTION OF THE PREFERRED EMBODIMENTS

Figure 1:
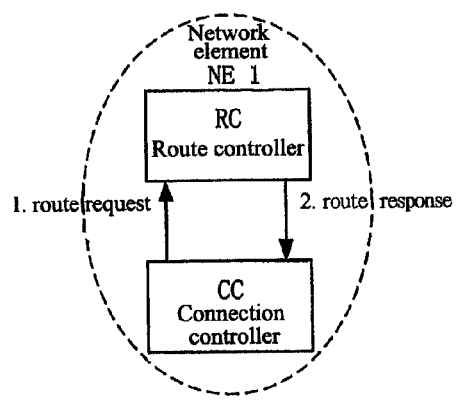
FIG. 1 is a schematic diagram of route query for the single ASON network element.

The route query method of the present invention will be further described in detail with reference to the figures and the specific embodiments.

In order to solve the problem that RC of the single ASON network element in the route domain can not perform the route query, the present invention provides a realization strategy based on the current technology. The present invention provides a route query method based on the source route and hierarchy route model suggested by ITU-T G.8080, and the method solves the route query problem within domain as well as the route query problem of cross-domain connection.

In order to achieve the above purpose, the key of the present invention is based on the joint route model, wherein the route query is performed through the interaction between RCs of ASON network elements between related parent domain and other domains of the same layer as well as between the parent domain and the sub-domains contained therein. The method that is employed in the present invention is as follows:

Based on the manual configuration or other methods, the RC of each route domain can obtain the information of RCs, including addresses, of the upstream domain (parent domain in short, and in corresponding to the parent domain, the domains that are included are called as sub-domains in short) and other domains of the same layer. When the route query is needed, the local route domain RC calls a routing algorithm (such as the CSPF) based on the route request, and completes the route calculation based on the route database RDB of the current node. If a complete route is not obtained, then said RC forwards the request to the RC of the upstream domain (parent domain), and completes the route query based on the interaction between the RC in the parent domain and the ones in other domains of the same layer.

In details, the method in the first technical solution of the present invention comprises steps as follows:

Step 1, the RC of the related ASON network element in the local domain detects the route query request, after it receives the request (including the information about the source node and the destination node), the next step is executed;

Step 2, based on the route query request, said RC calls the routing algorithm and completes the route calculation based on the route database RDB of the current node. If a complete route is obtained, then said RC returns the route query result to the requester (for example, the connection controller, CC) and the current query is done; if no complete route can be obtained by calculation, then the route query request will be forwarded to the RC in the parent domain, and proceeding to the next step;

Step 3, the RC in the parent domain interacts with each sub-domain to fulfill the hierarchy route query in the local domain. If a complete route is obtained, then the route query result will be returned to the requester through the RC that initiates the request, and the current query is done; if no complete route can be obtained through calculation (including the case of calculation failure, same as follows), then the route query request is forwarded to a certain domain RC of the same layer as the RC in the parent domain.

In the embodiment, the route query is done through the interaction between RC in each parent domain and the sub-domain RC that is contained in the parent domain.

The first solution is as follows: the RC in the parent domain interacts with each sub-domain RC to complete the route query, namely, the RC in the parent domain sends out the route query request to each sub-domain RC and each sub-domain RC returns the route query result of the local domain to the RC in the parent domain. The RC in the parent domain will combine to obtain a complete route of the parent domain.

The second solution is as follows: the RC in the parent domain interacts with one of the sub-domains and the sub-domains interact with each other to fulfill the route query, namely, the RC in the parent domain forwards the route query request to one of the subdomains, which first calculates the route within the domain, if the calculation succeeds, it returns the result to the parent domain, otherwise, the route query result will be forwarded to the subdomain of the same layer that is connected with the exit node of the local domain. This action will be repeated till the route query succeeds and the route query result is returned to the RC in the parent domain in the original path level by level.

However, the present invention does not limit the specific query method of route within the domain.

Step 4, the RCs in other domains (if the RCs include other sub-domains, the RCs are called the RCs in parent domains as well), execute the route query (if it is the parent domain, the same method in step 3 can be employed) and return the route query result to the RC in the parent domain of the same layer that initiates the route query request.

Step 5, based on the route query result returned by the RC of other domain of the same layer in step 4, if there is a complete route query result (some parent domain RC may have the capability of route query through the entire network) or the RC in the parent domain can combine the results returned from other domains of the same layer to obtain a complete route, then the RC in the parent domain returns the result to the RC that initiates the request and the current query is done; if no complete route can be obtained and there are still other RCs of the same layer that are not queried by the RC in the parent domain, then the RC in the parent domain forwards said route query request to the other RCs of the same layer which has not been queried, and step 4 is executed. If no complete route can be obtained and all the RCs of the same layer of this parent domain have been queried without reasonble result, then the route query failure message will be returned to the requester through the RC that initiates the request, this current query is done.

Based on the above method, some modifications are made in related steps, forming the second technical solution of the present invention. The method comprises steps as follows:

step 1, the RC in related ASON network element of the local domain detects the route query request, after it receives the request, the next step is performed;

Step 2, based on the route query request, said RC calls the routing algorithm (e.g. CSPF) and completes the route calculation based on the route database RDB of the current node. If a complete route is obtained, then said RC returns the route query result to the requester (e.g. CC) and the current query is done; If no complete route can be obtained by calculation, then the route query request will be forwarded to the RC in the parent domain and proceeding to the next step;

Step 3, the RC in the parent domain interacts with each sub-domain to fulfill the hierarchy route query in the local domain. If a complete route is obtained, then the route query result will be returned to the requester through the RC that initiates the request, and the current query is done; if no complete route can be obtained through calculation, then the route query request is broadcasted to the RCs of all other domains of the same layer as the RC in the parent domain, proceeding to the next step;

Step 4, based on the route query result, the RCs of all other domains of the same layer as the RC in the parent domain completes the route query and returns the calculated route query result to the parent domain; then proceeding to the next step;

Step 5, after the RC in the parent domain receives one or multiple route query results from the RCs of other domains of the same layer, if it can select a complete route (if there is only one RC result, then no selection is needed) or it can combine multiple partial routes to obtain a complete one, then the route query result is returned to the RC that initiates the request, and the current query is done. If no complete route can be formed, then the route query failure message will be returned to the requester through the RC that initiates the request, the current query is done.

Based on the above first and second technical solution, some modifications have been made in related steps, forming the third technical solution of the present invention. The method comprises steps as follows:

Step 1, the RC in the related ASON network element of the local domain detects the route query request, after it receives the request, the next step is performed;

Step 2, based on the route query request, said RC calls the routing algorithm (e.g. CSPF) and completes the route calculation based on the route database RDB of the current node. If a complete route is obtained, then said RC returns the route query result to the requester (e.g. CC) and the current query is done; if no complete route can be obtained by calculation, then the route query request will be forwarded to the RC in the parent domain, and proceeding to the next step;

Step 3, the RC in the parent domain determines whether the said route query request is the cross-domain query request or not; if it is not, then the RC in the parent domain completes the route calculation within the local parent domain and the route query result will be returned to the requester through the RC that initiates the request, the current query is done; if it is, based on the destination of the route query request, the RC in the parent domain determines the exit border of the route within the local domain and calculates the route within the domain, after successfully calculation, it sends out the route query request to the RC in another domain of the same layer that is connected with the exit border and proceeding to the next step. If the local domain route calculation fails, the route query failure message will be returned to the requester through the RC that initiates the request and the current query is done;

Step 4, as it is described in step 3, after the RC in another route domain of the same layer receives the route query request, it determines whether the destination node is in the local domain (including the sub-domain) or not, if yes, said RC calculates the local domain route and returns the calculation result to the upstream domain (the domain that initiates the route query request to the local domain); otherwise, then based on the route destination, said RC determines the exit border of the route in the local domain and calculates the local domain route. If the calculation succeeds, the route query request will continue to be sent out to the downstream domain (the domain that will receive the route query request of the local domain); if the calculation fails, the failure message will be returned to the upstream domain;

Multiple such queries will be performed until the RC in the domain in which the destination node locates returns the calculation result to the upstream domain;

Step 5, after other domains that are of the same layer as the parent domain of the route entry receive the route query result returned from the route query downstream domain, if the calculation succeeds, i.e., a complete route for the downstream domain is obtained, then combined with the result calculated in the local domain in step 4, the route calculation result is returned to the upstream domain continuously, after the results reach the RC of the entry parent domain described in step 3, then a complete route will be returned to the requester through the RC that initiates the request, the current query is done. If the route query failure message is received, the message will be passed to the upstream domain, after the results reach the RC of entry parent domain described in step 3, the route query failure message will be returned to the requester through the RC that initiates the request, the current query is done.

The three technical solutions for the joint route query method of the present invention will be further described in detail with reference to the diagrams.

Figure 2:
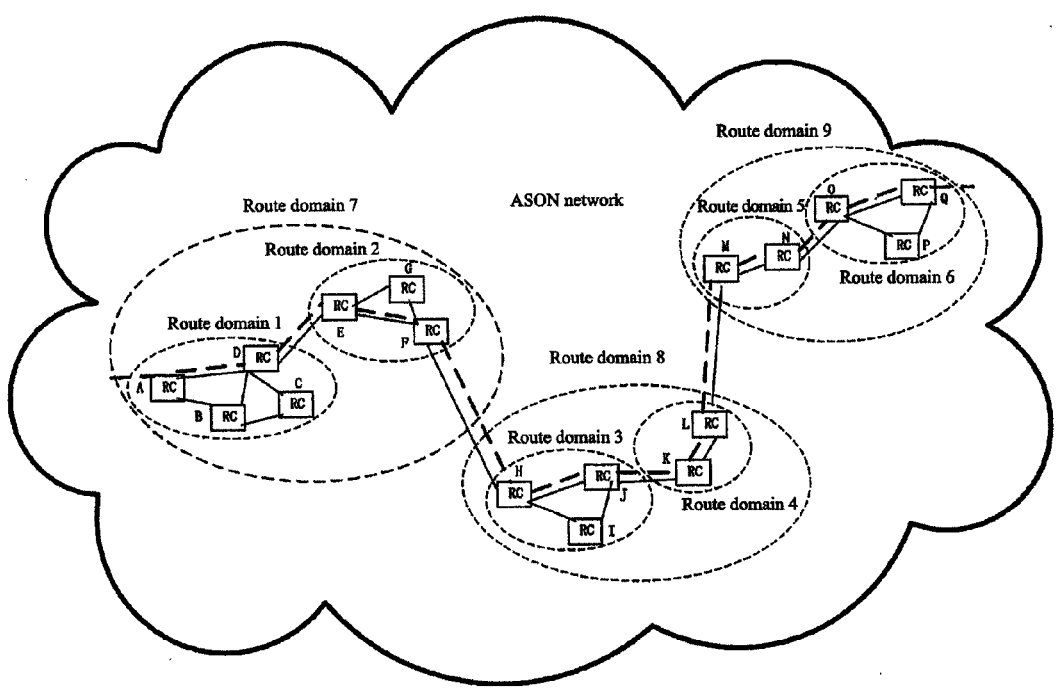
FIG. 2 is a situation diagram when an ASON network includes a plurality of route domains.
Figure 3:
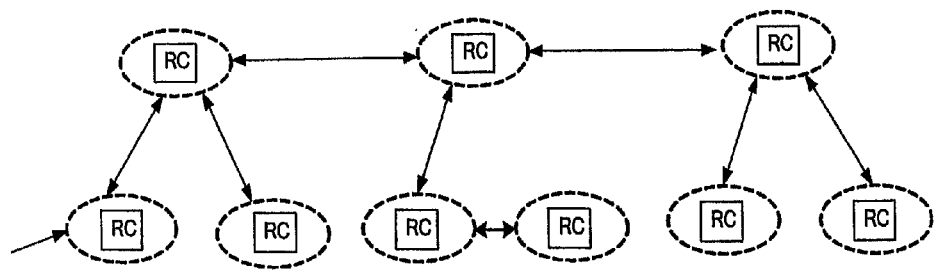
FIG. 3 is a modeling diagram of the interaction of RCs that employs joint route query method in the embodiments of the present invention.
Figure 4:
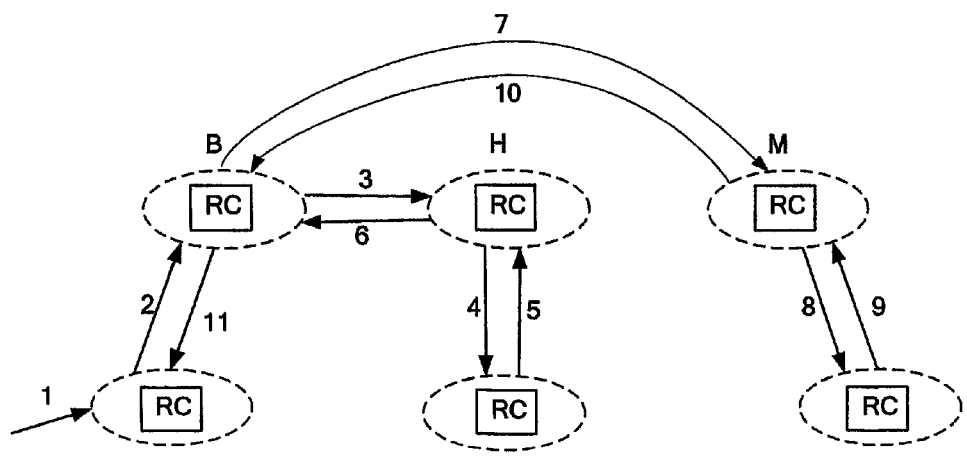
FIG. 4 is a flowchart of the interaction of the individual RCsin the first technical solution of the present invention.
Figure 5:
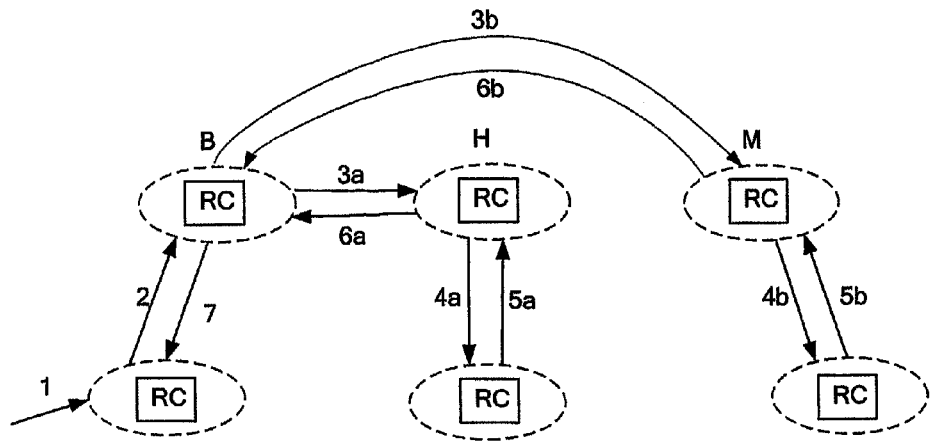
FIG. 5 is a flowchart of the interaction of the individual RCsin the second technical solution of the present invention.
Figure 6:
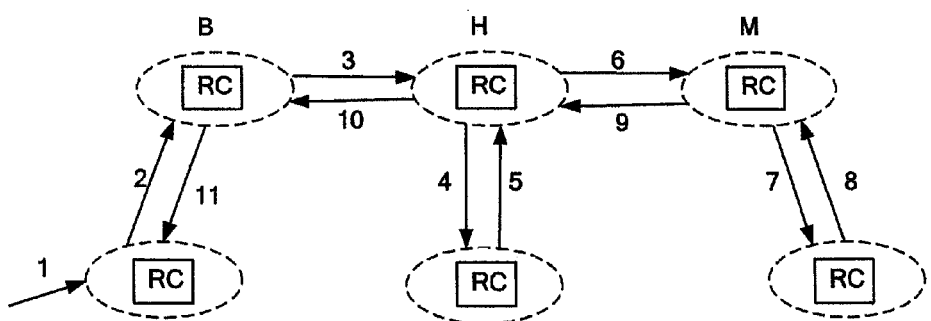
FIG. 6 is a flowchart of the interaction of the individual RCsin the third technical solution of the present invention.
Figure 7:
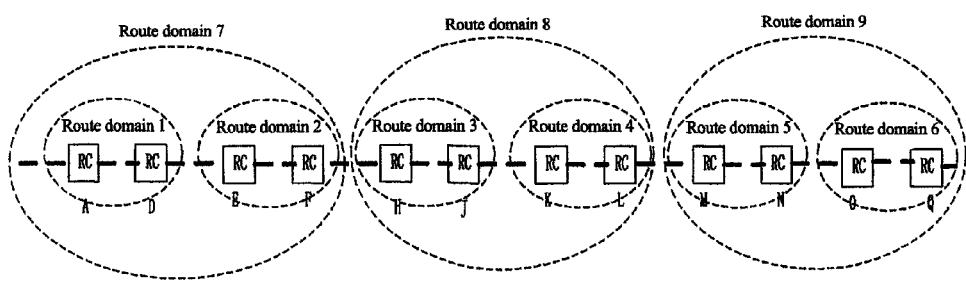
FIG. 7 is a schematic diagram of the final route calculation result of the present invention based on the network in FIG. 2.
Figure 8:
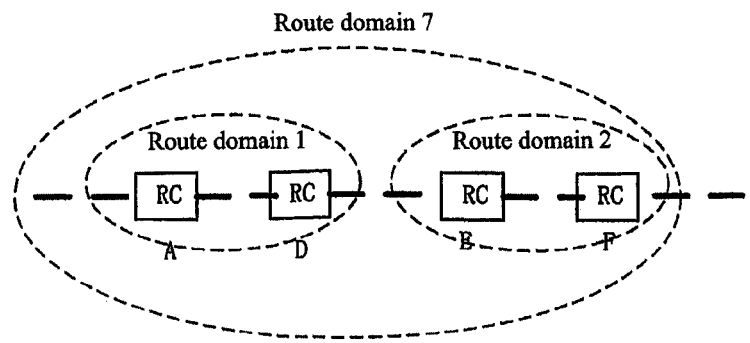
FIG. 8 is a schematic diagram for the RC in parent domain 7 calculating the routes between sub-domains as well as the parent domain exit routes based on the third technical solution of the present invention in the network shown in FIG. 2.
Figure 9:
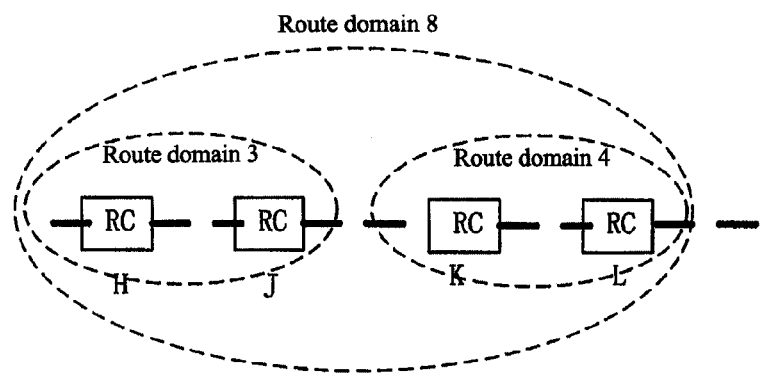
FIG. 9 is a schematic diagram for the RC in parent domain 8 calculating the routes between sub-domains as well as the parent domain exit routes based on the third technical solution of the invention in the network shown in FIG. 2.
Figure 10:
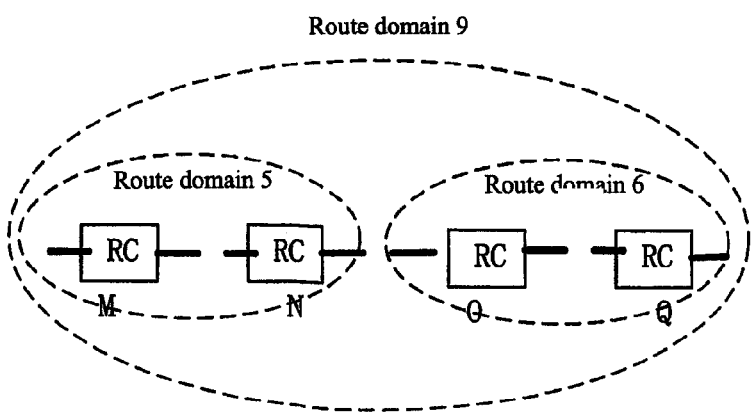
FIG. 10 is a schematic diagram for the RC in parent domain 9 calculating the routes between sub-domains based on the third technical solution of the invention in the network shown in FIG. 2.

FIG. 1 is a schematic diagram for the single ASON network element in completing route query through local CC and RC interaction; FIG. 2 describes the situation where an ASON network includes a plurality of route domains; FIG. 3 is a modeling diagram of RC interaction in which joint route query method of the present invention is employed; FIG. 4 is a flow chart of the interaction of the individual RCs in the first technical solution of the present invention; FIG. 5 is a flow chart of the interaction of the individual RCs in the second technical solution of the present invention; FIG. 6 is a flow chart of the interaction of the individual RCs in the third technical solution of the invention embodiments; FIG. 7 is a schematic diagram of the final route calculation result of the present invention based on the ASON network in FIG. 2; FIG. 8 is a schematic diagram for the RC in parent domain 7 calculating the routes between sub-domains as well as the parent domain exit routes based on the third technical solution of the present invention in the ASON network shown in FIG. 2; FIG. 9 is a schematic diagram for the RC in parent domain 8 calculating the routes between sub-domains as well as the parent domain exit routes based on the third technical solution of the present invention in the ASON network shown in FIG. 2; FIG. 10 is a schematic diagram for the RC in parent domain 9 calculating the routes between sub-domains based on the third technical solution of the present invention in the ASON network shown in FIG. 2.

With a combination of FIG. 1, FIG. 2, FIG. 3, FIG. 4, FIG. 7 and taking querying the route within the dash area in FIG. 2 as an example, wherein the route domain ASON network element A only has the information of route domain 1; ASON network element B is the route controller that belongs to the route domain 7 (parent domain), ASON network element H is the route controller that belongs to the route domain 8 (the other domains that are of the same layer as the parent domain); ASON network element M is the route controller that belongs to the route domain 9 (the other domains that are of the same layer as the parent domain), the details for the technical solution 1 will be described.

The implementation of the first technical solution comprises the following steps:

Step 1, the RCs of the individual ASON network elements in the route domains 1, 2, 3, 4, 5, and 6 detect for the route query request. The RC of ASON network element A in the route domain 1 receives the route query request, the starting point being A and the ending point being Q, then proceeding to the next step;

Step 2, based on the route query request, the RC of A calls the routing algorithm, such as CSPF to complete the route calculation based on the route database RDB of the current node. Since the RDB information of the current node is not complete, no complete route can be obtained through calculation. RC will forward the route request to the RC in the parent domain, namely the RC of network element B, and proceeding to the next step;

Step 3, based on the route query request, the RC of network element B interacts with the sub-domain RCs within the local domain to perform the route calculation. If a complete route can be obtained, the route query result will be returned to the RC of A, ending. If no complete route can be obtained through calculation, then the route query request will be forwarded to the RC of ASON network element H in the route domain 8 which is of the same layer as the parent domain (route domain 7);

Step 4, based on the received route query request, the RC of network element H executes the route query request and calculation on the hierarchy between the RC in the parent domain and the RC in the sub-domain; the route calculation result will be returned to the RC of ASON network element B in the route domain 7;

Step 5, based on the route query result returned by the RC of network element H in step 4, the RC of B will return said route query result to the RC of A if the route is complete, ending. If the calculation fails or no complete route information can be formed after combination, then the RC of B will forward said route query request to the RC of ASON network element M in the route domain 9 of the same layer as the parent domain (route domain 7) and the process as described in step 4 is repeated. If all the domains, including the route domain (as well as the sub-domains) 7, 8 and 9, are all queried and no complete route is obtained through the calculation or through the combination after calculation, the RC of B returns the route query failure message to the RC of A, ending.

After the route query is performed based on the above first technical solution, the successful route is shown in FIG. 7, in which a route from A to Q is shown.

Similarly, with a combination of FIG. 1, FIG. 2, FIG. 3, FIG. 5, FIG. 7 and taking querying the route within the dash area in FIG. 2 as an example, wherein the route domain ASON network element A only has the information of route domain 1; ASON network element B is the route controller that belongs to the route domain 7 (parent domain), ASON network element H is the route controller that belongs to the route domain 8 (the other domains that are of the same layer as the parent domain); ASON network element M is the route controller that belongs to the route domain 9 (the other domains that are of the same layer as the parent domain), the details for the technical solution 2 will be described.

The method of second technical solution comprises the following steps:

Step 1, the RCs of individual ASON network elements in the route domain 1, 2, 3, 4, 5, and 6 detect for the route query request. The RC of ASON network element A in the route domain 1 receives the route query request which has the starting point A and the ending point Q, and proceeding to the next step;

Step 2, based on the route query request, the RC of A calls the routing algorithm to complete the route calculation based on the RDB of the current node. Since the RDB information of the current node is not complete, a complete route can not be obtained through calculation. The RC will forward the route request to the RC in the parent domain, namely the RC of network element B, then proceeding to the next step.

Step 3, based on the route query request, the RC of network element B (the RC in the parent domain) interacts with the sub-domain RCs within the local domain to perform the route calculation. If a complete route can be obtained, the route query result will be returned to the RC of A, ending. If no complete route can be obtained through calculation, then the route query request will be forwarded to the RC of ASON network element H in the route domain 8 and to the RC of ASON network element M in the route domain 9.

Step 4, the RCs of network element H and M interact with the sub-domain RC within the local domain to perform the route calculation and then returns the route query result to the RC of network element B.

Step 5, the RC of B receives the route query results that are feedbacked from one or multiple RCs successfully, and it chooses one of the complete routes (if there is only one RC feedack, then there is no need to choose), or it combines several query results to form a complete route which is returned to the RC that initiates the request, ending. If the route domain 8 and 9 both return failure messages or no complete route can be obtained after combination, then a failure message will be returned to the RC of A, ending.

Compared with first technical solution 1, in the step 3 of second technical solution, the RC of the route domain 7 (the parent domain) employs the parallel mechanism, and simultaneously sends out the route query request to each RC in different domains of the same layer (domains 8 and 9).

The query is performed by applying the second technical solution, the route after successfully querying is shown in FIG. 7, which shows the route from A to Q.

Similarly, with a combination of FIG. 1, FIG. 2, FIG. 3, FIG. 6, FIG. 7, FIG. 8, FIG. 9, FIG. 10 and taking querying the route within the dash area in FIG. 2 as an example, wherein the route domain ASON network element A only has the information of route domain 1; ASON network element B is the route controller that belongs to the route domain 7 (parent domain), ASON network element H is the route controller that belongs to the route domain 8 (the other domains that are of the same layer as the parent domain); ASON network element M is the route controller that belongs to the route domain 9 (the other domains that are of the same layer as the parent domain), the third technical solution will be described in detail.

The method of the third technical solution 3 comprises the following steps:

Step 1, the RCs of individual ASON network elements in the route domain 1, 2, 3, 4, 5, and 6 detect for the route query request. The RC of ASON network element A in the route domain 1 receives the route query request which has the starting point A and the ending point Q, and proceeding to the next step;

Step 2, based on the route query request, the RC of A calls the routing algorithm, such as CSPF, to complete the route calculation based on the route database RDB of the current node. Since the RDB information of the current node is not complete, no complete route can be obtained through calculation. The RC will forward the route request to the RC in the parent domain, namely the RC of network element B, then proceeding to the next step;

Step 3, the RC of B determines the request is a cross-domain query, then based on the route destination, it determines the route exit in the route domain 7; it calculates the route within the domain and the route calculation result is shown in FIG. 8, which is A-D-E-F. The route query request is sent out to the route controller H in the route domain 8;

Step 4, after the RC of network element H in the route domain 8 receives the route query request, based on the route destination, it determines the route exit in the route domain 8; it interacts with the sub-domain to calculate the route within the domain and the route result is shown in FIG. 9, which is H-J-K-L. Meanwhile, the route query request is also sent out to the RC of network element M in the route domain 9. Based on the destination network element, the route domain 9 interacts with the sub-domain to calculate the route within the domain and the route result is shown in FIG. 10, which is M-N-O-Q, it determines the destination node Q is within the local route domain and does not forward the route query request to other domains anymore; the calculation result is returned to the RC of H in the upstream domain;

Step 5, after receiving the route calculation result of RC of M, which is combined with its own calculation result, the RC of H sends the route calculation result after combination to the RC of B. Combining with its own calculation result, the RC of B sends a complete route query result information to the RC of A that initiates the route query request, returning to the step 1.

Based on the analysis from the above specific examples, the present invention uses the model of source route and hierarchy route recommended by ITU-T G8080 as the basis. Through the RC interaction of related network elements between parent domain and each sub-domain, as well as between different domains of the same layer, the route, especially the cross-domain route query, is completed corporately. It has the advantages of simplicity and reliability.

Certainly, the present invention has other embodiments as well, without departing from the spirit and the essense of the current invention, a person skilled in the art can, according to the present invention, make various corresponding changes or modifications, which though will fall into the protection scope of the claims enclosed in the invention.

INDUSTRIAL APPLICABILITY

The present invention discloses a joint route query method in the ASON network. It uses the model of source route and hierarchy route recommended by ITU-T G.8080 as the basis. Through the RC interaction of related network elements between parent domain and each sub-domain, as well as between different domains of the same layer, the route is completed corporately. A complete query result or one after combination will be returned to the RC that initiates the route query request through the parent domain. It has the advantages of succinctness and trustiness, especially for the task of cross-domain route query.

What is claimed is:

1. A joint route query method in an automatic switched optical network (ASON), comprising the following steps:
   (1) after a route controller (RC) in one route domain belonging to a parent domain receives a route query request from a requester, it calls a routing algorithm based on the route query request, calculates a route based on a route database of a current node; if a complete route is obtained, a route query result is returned to the requester, if no complete route can be obtained, the route query request will be forwarded to an RC in the parent domain as a route controller for being responsible for route query and calculation of the parent domain;
   (2) after receiving the route query request, the RC in the parent domain calculates a local-domain route or interacts with RCs in other domains which are at the same layer with the parent domain and responsible for route query and calculation of the other domains, if a complete route can be obtained through calculation or combination, the route query result will be returned to the requester through the RC that initiates the request, otherwise a failure message will be returned to the requester through the RC that initiates the request;
   wherein in step (2), the route query in the local domain performed by said RC in each parent domain by interacting with each sub-domain RC; namely, the RC in the parent domain sends the route query request to each sub-domain RC; each sub-domain RC returns the route query result of the local domain to the RC in the parent domain, and the RC in the parent domain obtains the complete route of the parent domain through combination.

2. The method in claim 1, wherein in step (1), said RC in one route domain can obtain RC information comprising address information in the parent domain and other sub-domains of the same layer.

3. The method in claim 1, wherein in step (1), based on the route query request, the routing algorithm called by said RC in one route domain is Constrained Shortest Path First, CSPF.

4. The method in claim 1, step (2) further comprising the following steps:
   (A1), after the RC in the parent domain receives the route query request, it performs a hierarchy route query in the local domain, if a complete route is obtained through the calculation, then the route query result will be returned to the requester through the RC that initiates the request; otherwise, the route query request will be forwarded to the RCs in other domains of the same layer as said RC in the parent domain;
   (A2), after the RCs in other domains have received the route query request, they perform a route query in the local domain, and the route query result will be returned to the RC in the parent domain that initiates the request;
   (A3), the RC in the parent domain that initiates the request decides whether a complete route has been obtained or can be obtained through the combination, if yes, the route query result will be returned to the requester through the RC that initiates the request, otherwise, performing the next step;
   (A4), the RC in the parent domain that initiates the request determines whether there exist RCs in other domains of the same layer in said parent domain that have not been queried yet, if there exist RCs in other domains of the same layer in said parent domain that have not been queried, said route query request will be forwarded to one RC that is not queried yet in other domains of the same layer and then returns to step (A2), otherwise a failure message will be returned to the requester through the RC that initiates the request.

5. The method in claim 1, step (2) further comprising the following steps:
   (B1), after the RC in the parent domain receives the route query request, it performs the route query in the local domain, if a complete route is obtained through the calculation, then the route query result will be returned to the requester through the RC that initiates the request; otherwise, the route query request will be broadcasted to the RCs in all other domains of the same layer;
   (B2), the RCs of the other domains of the same layer complete the route query in the local domain and return the route query result to the RC in the parent domain that initiates the request;
   (B3), the RC in the parent domain receives one or more of route query results from the RCs in other domains of the same layer, if a complete route can be selected or one can be obtained through the combination of multiple results, then the route query result will be returned to the requester through the RC that initiates the request, otherwise, the failure message will be returned to the requester through said RC.

6. The method in claim 1, step (2) further comprising the following steps:
   (C1), the RC in the parent domain determines whether said route query request is a cross-domain query request; if it is not the cross-domain query request, the RC in the parent domain completes the hierarchy route query in the local domain, and the route query result will be returned to the requester through the RC that initiates the request; if it is the cross-domain query request, performing the next step;
   (C2), the parent domain determines an exit border of the route in the local domain based on the route destination; after successfully calculating the route of the local domain, it sends out the route query request to the RC in another domain of the same layer that is connected with the exit border, then performing the next step; if the calculation of the route in the local domain fails, the route query failure message will be returned to the requester through the RC that initiates the request;
   (C3), after the RC in another domain of the same layer receives the route query request, said RC determines whether a route destination node is in the local domain, if yes, after calculating the route in the local domain, said RC returns the route calculation result to the RC in the parent domain that initiates the request, and performing step (C4); otherwise, said RC determines the exit border of the route based on a route destination and calculates the route in the local domain, after successful calculation, said RC continues sending the route query request to the RCs of the same layer that is connected with the exit border, and performing the next step; if the calculation of the route fails, the route query failure message will be returned to the RC of the domain that initiates the request;

multiples of requests will be done until the RC in the domain where the destination node is located returns the route calculation result to an upstream domain;

(C4), the RC in each domain on a route path receives the successful route calculation result that is returned from a downstream domain and then sends the successful route calculation result back to the domain RC that initiates the request together with the route query result calculated in the local domain; such an operation is repeated until the route query result is returned to the RC in the parent domain as entry of the route query; said parent domain RC returns the complete route query result to the requester through the RC that initiates the request.

7. The method in claim 6, wherein in the step (C4), if the RC in each domain on the route path receives the failing route calculation result that is returned from the downstream domain, it passes the failure message to the upstream domain to reach the RC in an entry parent domain; the route query failure message will be returned to the requester through the RC that initiates the request.

8. The method in claim 1, wherein in the step (2), when the RC in the parent domain is interacting with a sub-domain RC which is the RC in the one route domain belonging to the parent domain, said RC in the parent domain forwards the route query request to one of the sub-domains; said sub-domain firstly calculates the route within the domain; if the calculation succeeds, the result is returned to the RC in the parent domain; otherwise, the route query result will be forwarded to the sub-domain of the same layer that is connected with the exit node of the local domain until the route query succeeds; finally the query result will be returned to the RC in the parent domain along an original path level by level.

* * * * *